Patented Feb. 9, 1954

2,668,862

UNITED STATES PATENT OFFICE 2,668,862

PROCESS FOR ACETAL PREPARATION

Walter E. Price, Jr., Baton Rouge, La., assignor to Standard Oil Development Company, a corporation of Delaware No Drawing. Application June 27, 1950, Serial No. 170,685

8 Claims. (Cl. 260—615)

This invention relates to a novel process for the production of acetals and, more particularly, to an improved process for producing and recovering higher molecular weight acetals and mixtures of acetals in high yields and purity, avoiding appreciable decomposition and destruction of the acetal during the isolation and purification of the acetal.

It has long been known that acetals are produced by the reaction of one mole of aldehyde with two moles of an alcohol to yield one mole of acetal. The reaction is an equilibrium one and can be represented by the following equation:

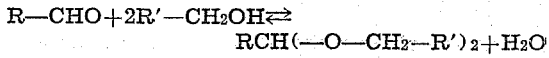

From the general equation it is obvious that in order to obtain a maximum yield of acetal the equilibrium considerations require that the reaction be forced to go to the right, as for instance, by continuously removing the by-product water formed during the acetalization reaction. Generally, the low molecular weight acetals having less than twelve carbon atoms can be readily prepared by refluxing the alcohol and aldehyde reactants together with an acid catalyst in the presence of a water entrainer. The water of reaction is removed from the reaction environment by distillation with a hydrocarbon entrainer. Excess reactants can also be removed by distillation.

This procedure does not give good yields of the higher molecular weight acetals prepared from straight chain aldehydes and alcohols. Neither is this a satisfactory method for the production of branched chain acetals. In the case of the straight chain acetals having twelve or more carbon atoms, the aldehydes and alcohols used must usually have at least four carbon atoms. These straight chain compounds become increasingly less reactive and more sluggish with increase of molecular weight in their response to mild reaction conditions.

A somewhat different but related problem exists in the case of highly branched chain aldehydes and alcohols. For instance, such aldehydes and alcohols are obtained by the Oxo synthesis reaction in which an olefin is subjected to oxonation with carbon monoxide and hydrogen to give an aldehyde product which is subsequently catalytically hydrogenated to the corresponding alcohol. When an attempt is made to prepare acetals from such products, they show great reactivity to form condensed products including acetals. These may, under conditions of heating, react further to lose a molecule of alcohol and give an unsaturated ether. Decomposition to tars and resins may also occur with these branch chain reactants. Thus extremely poor yields and conversions are obtained since starting products cannot be recovered from the reaction mixture.

It has now been found that both the higher molecular weight and the branched chain acetals can be prepared by a special procedure for the reaction and for the isolation of the acetal reaction product. Following this procedure, the mixture of alcohol and aldehyde is acetalized at relatively low temperatures by the addition of small amounts of acid catalyst. The reaction is forced to completion by the addition of an anhydrous salt which removes the water. The acetal is then separated by the addition of an aqueous alcohol mixture in which the acetal is essentially insoluble. It is not necessary to employ aldehydes and alcohols having the same number of carbon atoms since any mixture of aldehydes and alcohols may be acetalized by this process to give high molecular weight acetals.

This method has been successfully employed to prepare straight chain acetals of a range from $C_{12}$ to $C_{42}$ molecular weight. It has also been used to prepare $C_{24}$ to $C_{39}$ branched chain acetals from Oxo products obtained by oxonation of an olefin with carbon monoxide and hydrogen and then catalytic hydrogenation of the aldehyde product to the corresponding alcohol. Although in many cases, the acetals are present in the by-products produced during the oxo reaction, it is not possible to recover significant amounts of these high boiling components from the complex mixtures in which they occur. Prolonged heating such as would be necessary for recovery by distillation would result in decomposition with ultimate production of the unsaturated ether by loss of a molecule of alcohol from the acetal. The branched chain high molecular weight acetals have been found to be sensitive to other purification treatments. For instance, a $C_{24}$ acetal derived from Oxo products, when passed over clay, loses a molecule of alcohol and is thereby converted to the vinyl ether.

There are a number of critical features in the acetalization and recovery process which must be controlled in order to give an efficient overall process.

The alcohol and aldehyde reactants should be employed in the reaction in a two to one mole ratio. It is necessary in order to get a maximum yield and thereby have a minimum of recycling to have a fairly complete reaction. No more than a 10% excess of either reactant is usually required to force the reaction to completion.

It is necessary to have present a strong acid as, for instance, a strong mineral acid such as sulfuric acid, anhydrous hydrogen chloride or phosphoric acid. It is also possible to use a strong organic acid such as the sulfonic acids or trichloracetic acid. The weak organic acids are generally inoperative. From the standpoint of isolation and purification, anhydrous hydrogen chloride is to be preferred as the catalyst.

The water of reaction is continuously taken up by the presence, in the reaction mixture, of a molar quantity of a dehydrating salt, for instance, sodium sulfate or calcium chloride can be conveniently employed. One mole of water is produced for each mole of acetal formed. The salt employed should be substantially neutral, or acidic.

The reaction is permitted to proceed at low temperatures, as far instance, room temperature up to 90–100° F. It is critical to keep the temperature below the boiling point of the mixture. If carried out in this manner, the acetalization reaction produces good yields of both the high molecular weight straight chain acetals and the branched chain acetals, with no unsaturated ether being formed the unsaturated ether apparently being a decomposition product of the acetal after it has formed. Less than 10% acetal is recovered if there is prolonged heating of the acetal when the acetal is prepared by removal of the water with an hydrocarbon entrainer. No such diluent or entrainer is employed in this process.

The reaction is allowed to stand at reaction temperature for a period of time such that the reaction is substantially complete. This time depends somewhat on the structures of the alcohol and aldehyde from which the acetal is being made. Stirring is preferably employed to insure good agitation. A period of time of 24 to 48 hours is usually adequate to insure that the acetalization has substantially proceeded to completion.

The acetal is isolated by the addition of aqueous alcohol in a one to one volume ratio to the amount of reaction mixture. The alcohol used should necessarily be at least partly water soluble. Those which can be used include ethyl, isopropyl, and no-propyl alcohols. There must also be a certain amount of water added with the alcohol. From 5–20% water based on the alcohol can be used. About 5% is the preferred amount. The addition of this alcohol-water mixture causes the heavy acetal to separate out as a bottom layer from which it can be drawn off after settling.

The crude acetal layer can be purified by washing with dilute aqueous alkali such as sodium carbonate solution to remove residual acid. The final product can be purified by an additional washing with alcohol and water or it can be subjected to a simple vacuum distillation. In some cases it may be desirable to lower the temperature during the separation process to cause a decrease in the solubility of the acetal and thereby improve the yield. An additional extraction of the acetal layer may be required in order to remove dissolved alcohol and water. The table shows the solubilities in aqueous alcohol of some of the acetals prepared by this method. Their molecular weights range from $C_{12}$ to $C_{39}$ and the acetals prepared include both high molecular weight straight chain alcohols and branched chain alcohols.

TABLE

*Physical properties of acetals*

| Acetal | Mol. Wt. Range | Solubility in Strength ETOH | Alcohol @ 25° C. g. Acetal/100 Mls. ETOH | B. P. | Density at 25° C. |
|---|---|---|---|---|---|
| 2-Ethyl hexaldehyde, 2-Ethyl hexylacetal. | $C_{24}$ | 95 | 6 | 384° F. @ 15 mm | 0.79 |
| n-Decylaldehyde, n-Decylacetal. | $C_{30}$ | 95 | 7 | | 0.75 |
| $C_{39}$ Oxo Acetal (Prepared from crude $C_{13}$ oxo alcohol and $C_{13}$ oxo aldehyde). | $C_{39}$ | 95 | 10 | | 0.80 |
| n-Butyraldehyde, n-Butylacetal. | $C_{12}$ | 95 / 80 | ∞ / 60 | 210° F. @ 10 mm | 0.71 |

This process may also be utilized for the preparation of cyclic type diethers by condensation of aldehydes with cyclic alcohols. High molecular weight mercaptals may also be made in this novel manner.

The acetals are finding a number of increasingly important uses. For example, they can be used for solvents, as for instance, cellulose acetate, and higher molecular weight materials.

These high molecular weight acetals are stable in the presence of small amounts of acid at room temperature. However, elevated temperature and/or the presence of water may cause the acetal to split off alcohol and form an unsaturated ether. The acetals are stable with water under alkaline conditions. Steam distillation may cause a certain amount of acetal hydrolysis. The invention will be described in more detail by the specific examples to follow.

EXAMPLE I

*Preparation of acetal from n-decylaldehyde and n-decyl alcohol*

A mixture of n-decyl alcohol and n-decylaldehyde are contacted in the presence of anhydrous hydrogen chloride at approximately room temperature under conditions of vigorous agitation. The water formed during the reaction is adsorbed by the addition to the reaction mixture of about one mole of anhydrous sodium sulfate. After standing for about 48 hours an amount of 95% ethyl alcohol is added in a volume approximately equivalent to the volume of the reaction mixture. The acetal, which is substantially insoluble in the ethanol-water solution, separates out as a bottom layer. This layer is drawn off and water washed. If desired, for additional purity, it can be distilled under reduced pressure. An acetal product of $C_{30}$ molecular weight and of high purity is obtained in about 80% yield.

An acetal of $C_{24}$ range has been similarly prepared in high yields from 2-ethyl hexanol and 2-hexaldehyde. A $C_{12}$ acetal from n-butyl alcohol and n-butyraldehyde has also been made satisfactorily by this method.

EXAMPLE II

*Preparation of acetal from $C_{13}$ Oxo aldehyde and $C_{13}$ Oxo alcohol*

In preparing a highly branched $C_{39}$ acetal from Oxo products, there were employed an Oxo aldehyde and an Oxo alcohol produced by oxonation of a $C_{12}$ olefin with carbon monoxide and hydrogen to give the aldehyde followed by catalytic hydrogenation of the aldehyde to give the alcohol. A 2 to 1 mole ratio of aldehyde and alcohol is acetalized by stirring the mixture at room temperature in the presence of anhydrous hydrogen chloride as the catalyst. A molar equivalent amount of anhydrous sodium sulfate is added to adsorb the water of reaction. Following completion of reaction, an equal volume of 95% ethyl alcohol is added. The Oxo acetal separates as a separate bottom layer which is removed. The acetal layer is washed and there is recovered in about 70–80% yield a $C_{39}$ Oxo acetal of good purity. The $C_{24}$ acetal, from $C_8$ Oxo products, may be similarly prepared.

What is claimed is:

1. A process for the preparation and isolation of a difficultly preparable high molecular weight acetal having at least twelve carbon atoms which comprises reacting one mole of an aldehyde having at least four carbon atoms with two moles of an alcohol having at least four carbon atoms in the presence of an acidic acetalization catalyst, adsorbing the water of reaction with an anhydrous salt, at approximately room temperature but no higher than 100° F. for a time sufficient for the acetalization to proceed to substantial completion; thereafter adding a volume of aqueous $C_2$–$C_3$ saturated aliphatic monohydric alcohol approximately equal to the volume of the reaction mixture, said alcohol containing from 5 to 20% water, settling the resulting mixture to form a bottom acetal layer, and removing the acetal bottom layer so formed.

2. A process for the preparation and isolation of an unstable branched chain acetal having at least twelve carbon atoms which comprises reacting one mole of an aldehyde having at least four carbon atoms and two moles of an alcohol having at least four carbon atoms in the presence of an acidic acetalization catalyst, adsorbing the water of reaction with an anhydrous salt, at approximately room temperature but no higher than 100° F. for a time sufficient for the acetalization to proceed to substantial completion, thereafter adding a volume of aqueous $C_2$–$C_3$ saturated aliphatic monohydric alcohol approximately equal to the volume of the reaction mixture, said alcohol containing from 5 to 20% water, settling the resulting mixture to form a bottom acetal layer, and removing the acetal bottom layer so formed.

3. A process for the preparation of a high molecular weight acetal having at least twelve carbon atoms which comprises reacting one mole of an aldehyde having at least four carbon atoms with two moles of an alcohol having at least four carbon atoms in the presence of anhydrous hydrogen chloride and a molar equivalent of anhydrous sodium sulfate at approximately room temperature but no higher than 100° F., thereafter adding a volume of aqueous ethyl alcohol containing from 5 to 20% water, approximately equal to the volume of the reaction mixture, settling the resulting mixture to give a bottom acetal layer, and removing the bottom acetal layer so formed.

4. A process according to claim 3 in which the aldehyde is 2-ethyl hexaldehyde, and the alcohol is 2-ethyl hexyl alcohol.

5. A process according to claim 3 in which the aldehyde is n-decylaldehyde and the alcohol is n-decyl alcohol.

6. A process according to claim 3 in which the aldehyde is n-butylaldehyde and the alcohol is n-butyl alcohol.

7. A process according to claim 3 in which the aldehyde is a $C_{13}$ Oxo aldehyde and the alcohol is a $C_{13}$ Oxo alcohol.

8. A process according to claim 3 in which the alcohol is a $C_8$ Oxo aldehyde and the alcohol is a $C_8$ Oxo alcohol.

WALTER E. PRICE, Jr.

References Cited in the file of this patent

UNITED STATES PATENTS

| Number | Name | Date |
|---|---|---|
| 2,446,171 | Croxall et al. | Aug. 3, 1948 |
| 2,448,660 | Croxall et al. | Sept. 7, 1948 |
| 2,449,469 | Gresham | Sept. 14, 1948 |
| 2,451,949 | Heinemann | Oct. 19, 1948 |
| 2,519,540 | Bramwyche et al. | Aug. 22, 1950 |
| 2,535,458 | Robeson | Dec. 26, 1950 |

FOREIGN PATENTS

| Number | Country | Date |
|---|---|---|
| 257,622 | Great Britain | Mar. 24, 1927 |

OTHER REFERENCES

Adams et al.: Jour. Am. Chem. Soc., vol. 47, pages 1358–67 (1925).